United States Patent [19]

van den Nieuwelaar et al.

[11] Patent Number: 4,766,644
[45] Date of Patent: Aug. 30, 1988

[54] MOUNTING SUPPORT

[75] Inventors: Josephus A. van den Nieuwelaar, Gemert; Petrus C. H. Janssen, Wilbertoord, both of Netherlands

[73] Assignee: Stork PMT B.V., Netherlands

[21] Appl. No.: 75,608

[22] Filed: Jul. 20, 1987

[30] Foreign Application Priority Data

Jul. 24, 1986 [NL] Netherlands .......................... 8601921

[51] Int. Cl.⁴ .............................................. A22C 21/00
[52] U.S. Cl. ...................................... 17/11; 17/44.1
[58] Field of Search ................... 17/11, 1 R, 24, 44, 17/44.1, 71

[56] References Cited

U.S. PATENT DOCUMENTS

| Re. 21,983 | 12/1941 | Brodeur | 17/11 |
|---|---|---|---|
| 2,015,262 | 9/1935 | Flagg et al. | 17/70 |
| 2,891,275 | 6/1959 | Schuls | 17/70 |
| 3,531,825 | 10/1970 | Segur et al. | 17/11 |
| 3,570,050 | 3/1971 | Draper et al. | 17/1.6 X |
| 3,946,461 | 3/1976 | Martin | 17/11 |
| 4,385,419 | 5/1983 | Cantrell | 17/1.6 X |
| 4,413,375 | 11/1983 | Cliff, Jr. | 17/24 X |
| 4,536,919 | 8/1985 | Cashwell et al. | 17/11 |
| 4,656,692 | 4/1987 | Villemin et al. | 17/44.1 |

FOREIGN PATENT DOCUMENTS 15315 5/1934 Australia .................. 17/11

Primary Examiner—Willie G. Abercrombie
Attorney, Agent, or Firm—Hurt, Richardson

[57] ABSTRACT

Device for supporting a carcass or part of a carcass of slaughtered poultry, having a first and a second support member having surface parts facing one another, in which one of the support members is so constructed that it is suitable for penetrating into connective tissue and/or flesh parts of the carcass.

5 Claims, 5 Drawing Sheets

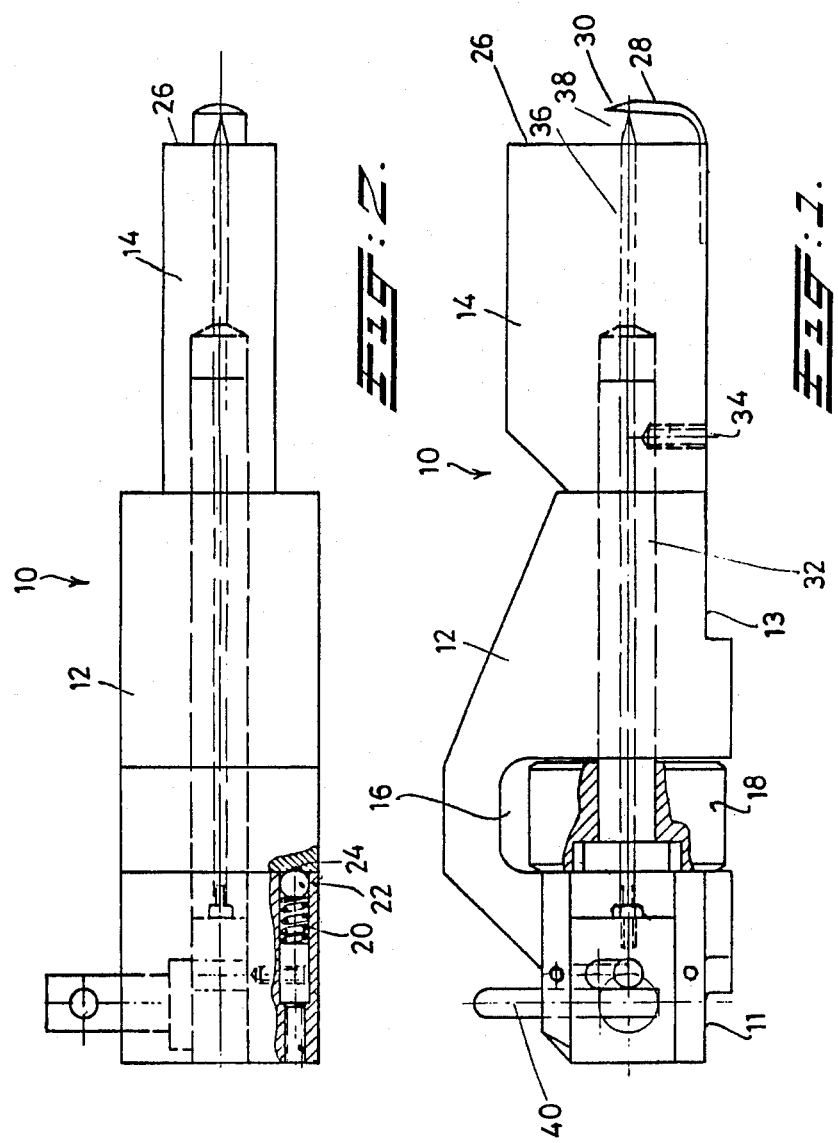

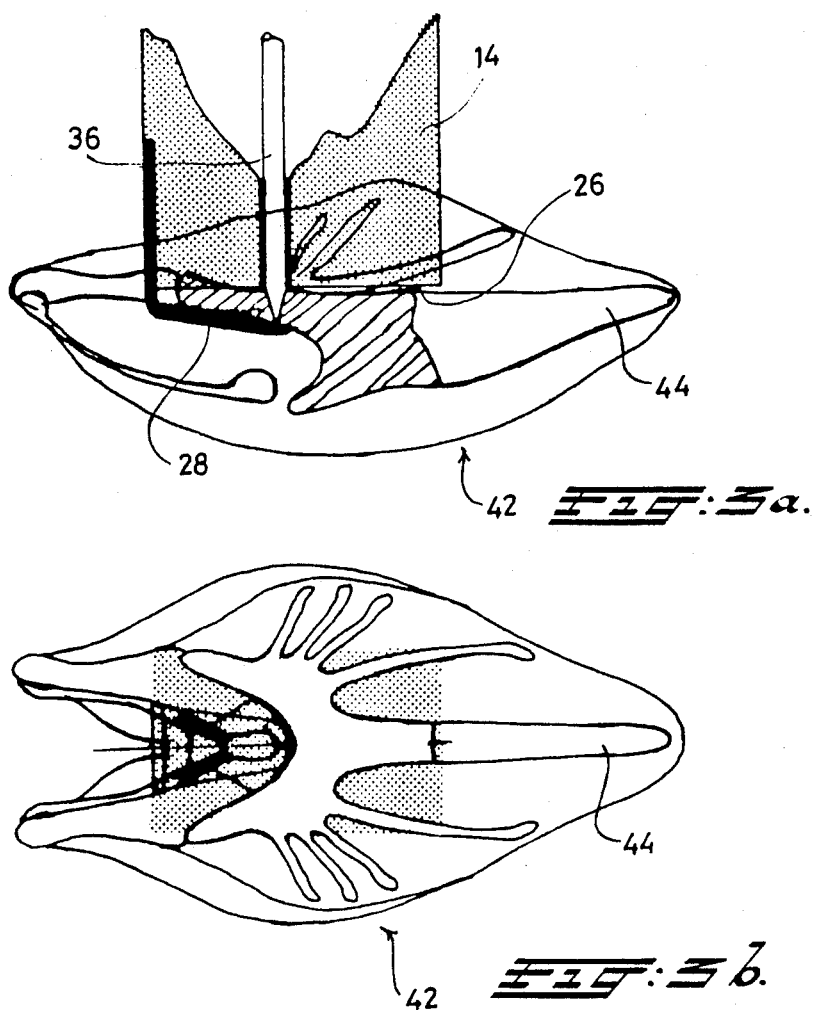

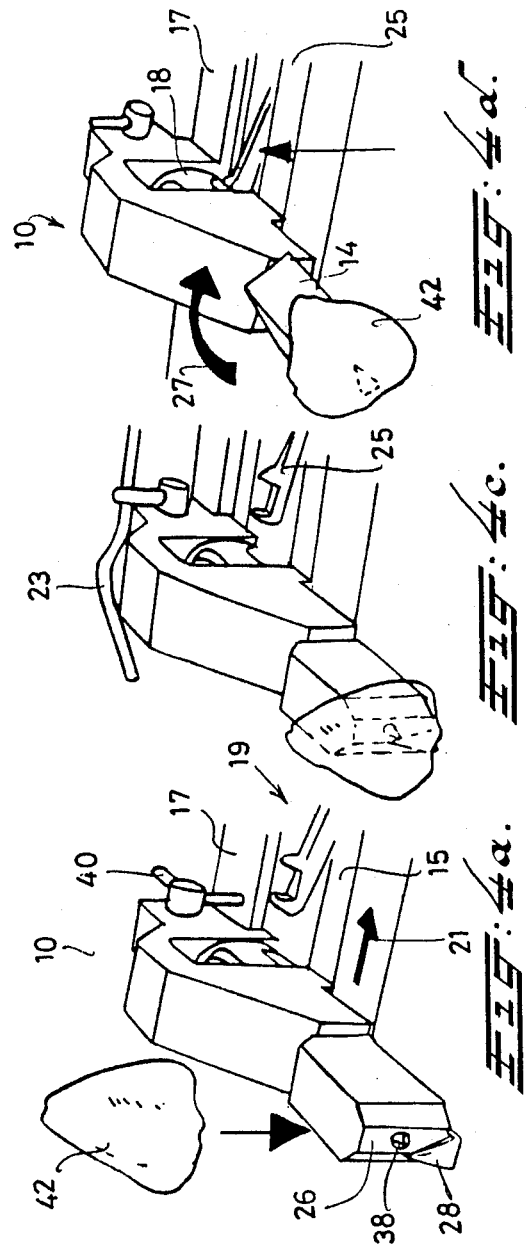
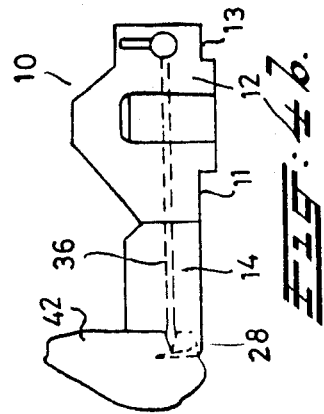

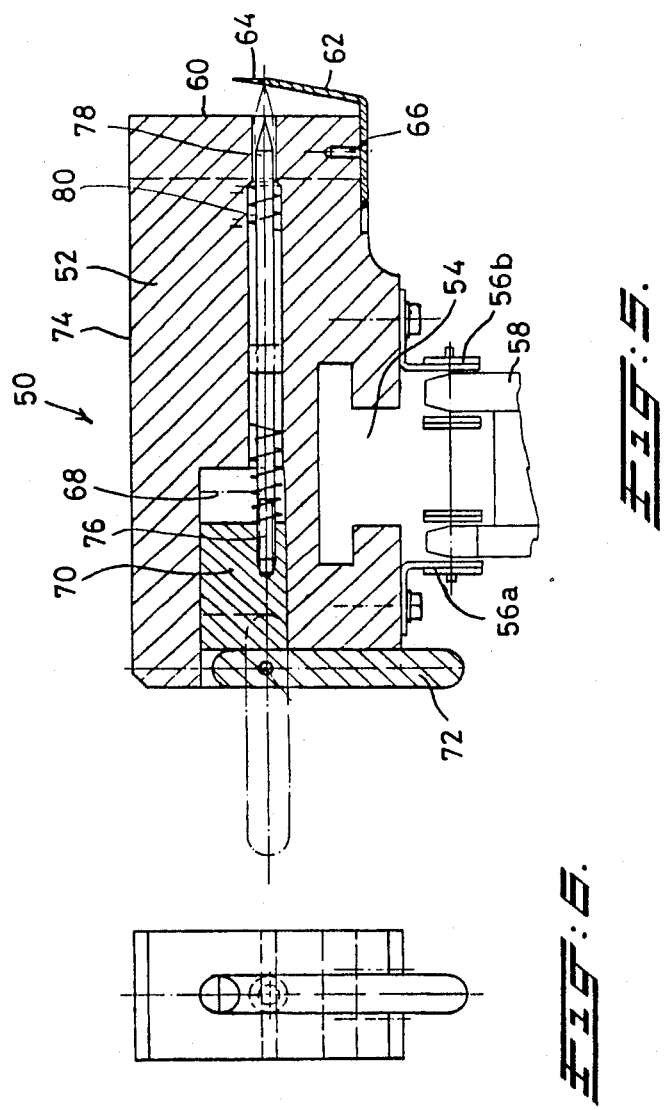

MOUNTING SUPPORT

BACKGROUND OF THE INVENTION

This invention relates to a device for supporting a carcass or part of a carcass of slaughtered poultry, comprising a first and a second support member having surface parts facing one another.

DESCRIPTION OF THE PRIOR ART

A device of this kind is the subject of the prior Netherlands Patent Application No. 8503287 in the name of the Applicants. In this patent application it has already been proposed to support a carcass or a part of a carcass, for the purpose of carrying out operations on it, on the least valuable parts, and the present application relates to a further development and improvement of that proposal.

SUMMARY OF THE INVENTION

According to the present application it is proposed to construct one of the support members in such a manner that it is suitable for penetrating into connective tissue or flesh parts of the carcass. In particular it is proposed that this device should be used in such a manner that by penetration into the carcass, directly next to the breastbone, with one of the support members, the breastbone will be embraced by the two support members. The device can be used as a filleting block for filleting breast portions, but also for supporting larger carcass parts, such as so-called "front halves" or even whole carcasses.

While in the abovementioned application it has already been proposed the fastening of the carcass or carcass part by a subsidiary portion thereof (back and neck), the present application goes still further and proposes to fix the carcass or carcass part by gripping a waste part (the breastbone). Damage to the flesh part is thus avoided, and support in the most hygienic manner possible is achieved. The clamping has to be effected only once, whereupon all necessary operations are directly possible. The two support members form a fixed reference point, in relation to which the carcass or carcass part is fastened, and this fixed reference point can thus also be used as a reference for carrying out mechanical operations.

Said support member can comprise at least one elongate member, preferably in the form of a blade. Preferably the other member is formed by the end face of a holder to which the first support member, extending parallel or at an acute angle to said end face, is fastened, said holder containing a locking member provided with a sharp point and adapted to move to-and-fro, in the direction of the first support surface, through an opening in the end face. Said locking member may consist of a locking pin. Preferably the holder is supported by a carrier for rotation about the longitudinal axis of the locking pin, and is formed by an elongate casing having a thickened end portion whose front face forms the end face and encloses an acute angle with the longitudinal axis of the casing while the securing member is received in said end part. It is furthermore advantageous when the holder is mounted on a conveyor track, so that a number of successive operations can be performed at the carcass piece at various successive processing stations.

DESCRIPTION OF THE DRAWINGS

The invention will now be explained on the hand of the drawings.

FIG. 1 is a side view, partly in section, of a first embodiment of the mounting supporting according to the invention.

FIG. 2 is a view from below, partly in section, of this embodiment.

FIGS. 3a and 3b illustrate the position of this embodiment in relation to the parts of a breast portion which is to be filleted, in longitudinal section and bottom view respectively.

FIGS. 4a to 4d illustrate the use of this embodiment.

FIG. 5 is a longitudinal section of a second embodiment of the invention.

FIG. 6 is an end view of this embodiment.

DESCRIPTION OF PREFERRED EMBODIMENTS

Figure 7:
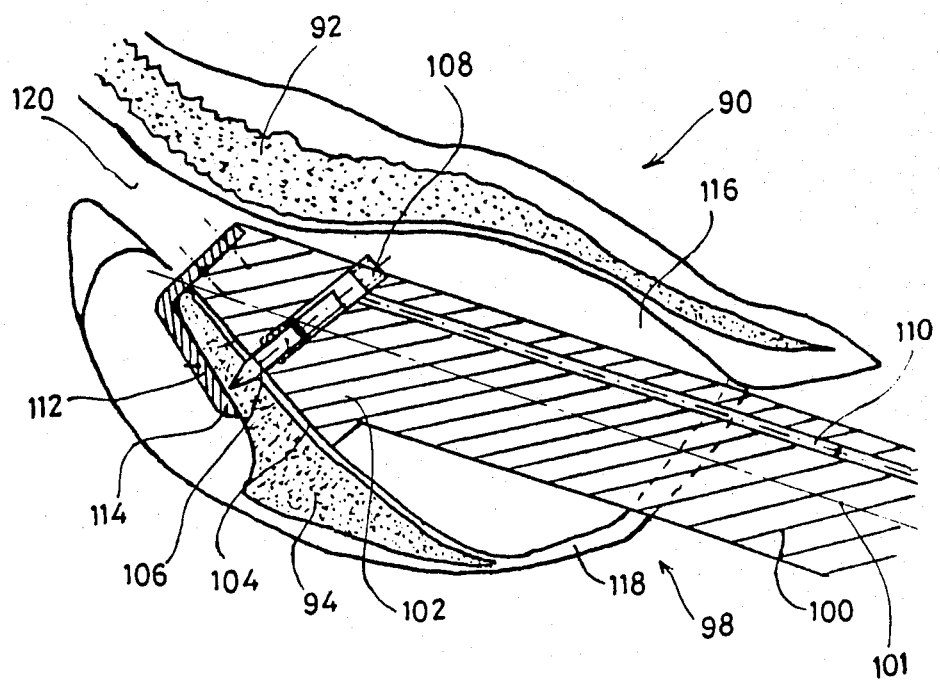
FIG. 7 illustrates the use of a third embodiment for supporting a large carcass part.

The embodiment shown in FIG. 1 and designated with numeral 10 is intended for supporting a breast portion which is to be filleted, and comprises a casing (or carrier block) 12 and a head (or support body) 14. The casing 12 has a recess 16, in which is received an operating member 18 (shown in the form a disc) adapted to turn with respect to the casing 12; by means of a ball 22, which is loaded by a spring 20 and which snaps into recesses in the operating member 18, desired angular distances can be adjusted.

Facing the end face 26 of the head 14 is disposed a bladelike separating member 28, which is fastened to the head 14 and has an end edge 30. A shaft 32 is fastened in the operating member 18, passing through a corresponding bore in the casing 12 and the head 14 and being fastened therein by a lock screw 34. An elongate pin 36 provided with a sharp point 38 at its free end passes through this shaft 32. The pin 36 can be moved in the longitudinal direction by means of the eccentric operating member 40.

FIGS. 3a and 3b show the use of this embodiment for securing a breast portion 42. As shown in the drawing, the end face 26 of the head 14 and the blade 28 embrace the breastbone 44, while when the device is thus fitted the sharp end of the blade 28 penetrates into the flesh 46 directly adjoining the breastbone 44. By means of the pin 36, which is thereupon pressed into the breastbone 44, additional security is achieved in the fastening of the breast portion on the mounting support, which in one embodiment, in which the breast portion can be turned into different positions, may be of importance, although not essential.

Since the head 14 can turn with respect to the casing, the breast portion can be variously positioned for different operations to be carried out for the purpose of removing the breast flesh 46, all as shown in FIGS. 4a to 4d.

These figures show how the device 10 rests by the bottom surfaces 11 and 13 on the guideways 15 and 17 of a conveyor track 19, along which it is moved in the direction of the arrow 21 (see FIG. 4b).

FIG. 4a illustrates the mounting of the breast portion with the breastbone between the end face 26 and the blade 28; by means of the operating member 40 the pin 36 is operated so that its point 38 penetrates into the breastbone. This operating of the member 40 can be effected by hand, but also with the aid of an appropriate guide 23, along which the support device 10 moves. Between the guideways 15 and 17 a fixed stop 25 is disposed, which cooperates with the operating member 18 and, on the passing of the filleting block, turns the head 14 together with the breast portion 42 by means of this operating member 18 into a position suitable for a certain operation, for example in the direction of the arrow 27. The operations can be carried out either by hand or by means of tools installed at various processing stations.

FIGS. 5 and 6 relate to a slightly modified embodiment, which is based on the same principle and is used in the same way. This embodiment of the mounting block according to the invention, which is indicated as a whole by the reference numeral 50, comprises the casing 52 provided with a recess 54, which is T-shaped in section and by means of which the casing is mounted on a suitable carrier of corresponding profile. The casing 52 is coupled by means of brackets 56a, 56b to a drive chain 58 and, carrying a carcass part, is carried along a number of processing positions. At on end (the right-hand end in the drawing) the casing 50 ends in an end face 60, opposite a blade-shaped separating member 62 having an end edge 64 is disposed and fastened by means of the screw 66; at the other end the casing 50 has a recess 68 containing a sliding member 70, which can be moved in the longitudinal direction of the casing by means of a pawl 72. An elongate pin 74 is fastened by its left-hand end 76 in the sliding member 70; its sharp right-hand end 78 lies opposite the end of the blade 62. A spring 80 disposed around the pin 74 urges the sliding member 70, and consequently the pin 74, into a position in which its tip 78 is retracted.

The embodiment described above is used in the same way as the embodiment previously described.

With both embodiments the breastbone can be fractured after the breast portion has been secured, breaking in the brittle part of the bone, that is to say where the pin penetrates into the bone. The fillet thus spreads out, and the ribs can easily be removed. The use of the pin provides the advantage that the bone is weakened by the penetration of the pin.

The use of the device according to the invention obviously goes further than solely supporting a breast portion for the removal of the breast meat. FIG. 7 shows schematically an embodiment which is particularly suitable for supporting larger carcass parts, such as indicated as a whole by the reference numeral 90; the figure also shows the backbone 92 and the breastbone 94 with the breast fillet 96. The mount support 98 is here provided with the casing 100, which at the front end terminates in the head 102, whose front face 104 includes an acute angle with the longitudinal axis of the casing 100. The head 102 contains the locking pin 106, which for example can be operated hydraulically by supplying pressurized water to the space 108 behind the pin 106 via the passage 110. Here again the separating member 112 equipped with the end edge 114 and cooperating with the end face 104 is provided.

The mounting support is introduced into the body cavity 116 through the usual extraction opening 118 formed in a previous operation, and is pressed into the head and neck cavity until the end edge 114 of the blade 112 has passed the front edge of the breastbone 94; the blade can then be hooked around the front edge of the breastbone.

It is observed that in all embodiments the separating member penetrating into the immediate proximity of the breastbone, in conjunction with the end surface facing it, forms a fixed reference point, in relation to which the carcass part is positioned, so that the operations on the carcass part can be carried out not only by hand, but also with tools which can be adjusted in relation to this reference point. Since the separating member penetrates into the carcass part in the immediate proximity of the breastbone, no valuable breast meat is damaged.

What is claimed is:

1. Device for supporting a carcass or part of a carcass of slaughtered and eviscerated poultry on the inside of the body cavity, comprising a support body with an end face and a support member in the form of a sharpened blade suitable for penetrating into connective tissue at the exterior of the breast bone of said carcass, and extending substantially parallel to or at an acute angle to said end face.

2. Device according to claim 1, which further comprises a sharply pointed locking pin displaceably mounted in the support body in a direction perpendicular to the end face, permitting a fully retracted position and an extended position in which the point can penetrate into the breast bone of the carcass to securely fasten the carcass between the support body and the support member.

3. Device according to claim 2, wherein the support body is attached to a carrier block, and the carrier block is rigidly fastened to a conveyor track.

4. Device according to claim 3, wherein the carrier block includes a bore extending inside the carrier block and the support body is attached rotatably, around the axis of the locking pin, to the carrier block by means of a shaft-like extension of the support body which fits in the bore of the carrier block.

5. Device according to claim 4, in which at the free end of the shaft-like extension an operating member is fitted, which at one surface thereof is provided with a number of circular recesses, and in the carrier block a second bore is provided in which a spring loaded ball is placed which ball can snap into a recess in the surface of the operating member.

* * * * *